US007795330B2

(12) United States Patent
Birmingham et al.

(10) Patent No.: US 7,795,330 B2
(45) Date of Patent: Sep. 14, 2010

(54) PREPARATION OF ORGANIC ADDITIVE-TREATED, PYROGENIC SILICA-ENCAPSULATED TITANIUM DIOXIDE PARTICLES

(75) Inventors: John Nicholas Birmingham, Wilmington, DE (US); Stephen Claude De La Veaux, Wilmington, DE (US); Yunghsing Samson Hsu, Long Beach, MS (US); Peter Jernakoff, Wilmington, DE (US); Kevin Joseph Leary, Middletown, DE (US); Charles David Musick, Waverly, TN (US); Philipp M Niedenzu, Wilmington, DE (US); Narayanan S Subramanian, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/157,814

(22) Filed: Jun. 12, 2008

(65) Prior Publication Data

US 2008/0280142 A1 Nov. 13, 2008

Related U.S. Application Data

(63) Continuation of application No. 10/993,456, filed on Nov. 19, 2004, now abandoned.

(60) Provisional application No. 60/565,773, filed on Apr. 27, 2004.

(51) Int. Cl.
*C08K 9/10* (2006.01)
*C08K 3/22* (2006.01)

(52) U.S. Cl. .................. 523/210; 523/200; 524/497; 524/585; 524/586

(58) Field of Classification Search .................. 523/210
See application file for complete search history.

(56) References Cited

U.S. PATENT DOCUMENTS

| 3,437,502 | A | 4/1969 | Werner |
| 3,834,924 | A | 9/1974 | Grillo |
| 3,856,929 | A | 12/1974 | Angerman et al. |
| 3,915,735 | A | 10/1975 | Moreland |
| 4,050,951 | A | 9/1977 | Piccolo et al. |
| 4,127,641 | A | 11/1978 | Aldcroft et al. |
| 4,141,751 | A | 2/1979 | Moreland |
| 4,214,913 | A | 7/1980 | Glaeser |
| 4,350,645 | A | 9/1982 | Kurosaki et al. |
| 4,430,001 | A | 2/1984 | Schurr |
| 4,460,655 | A | 7/1984 | Jacobson et al. |
| 4,810,305 | A | 3/1989 | Braun et al. |
| 5,288,320 | A | 2/1994 | Decelles |
| 5,397,391 | A | 3/1995 | Stramel |
| 5,560,845 | A | 10/1996 | Birmingham et al. |
| 5,562,764 | A | 10/1996 | Gonzalez |
| 5,562,990 | A | 10/1996 | Tooley et al. |
| 5,607,994 | A | 3/1997 | Tooley et al. |
| 5,631,310 | A | 5/1997 | Tooley et al. |
| 5,837,049 | A | 11/1998 | Watson et al. |
| 5,889,090 | A | 3/1999 | Tooley et al. |
| 5,922,120 | A | 7/1999 | Subramanian et al. |
| 5,959,004 | A | 9/1999 | Tooley et al. |
| 5,993,533 | A | 11/1999 | Diebold et al. |
| 6,022,404 | A | 2/2000 | Ettlinger et al. |
| 6,620,234 | B1 | 9/2003 | Kostelnik et al. |
| 6,646,037 | B1 | 11/2003 | El-Shoubary et al. |
| 6,713,543 | B2 | 3/2004 | El-Shoubary et al. |
| 6,783,586 | B2 | 8/2004 | Bettler et al. |
| 6,852,306 | B2 | 2/2005 | Subramanian et al. |
| 7,029,648 | B2 | 4/2006 | Subramanian et al. |
| 2003/0051635 | A1 | 3/2003 | Subramanian et al. |
| 2009/0126604 | A1 | 5/2009 | Akhtar et al. |
| 2009/0148605 | A1 | 6/2009 | Akhtar et al. |

FOREIGN PATENT DOCUMENTS

| EP | 1 591 490 A3 | 11/2005 |
| GB | 689123 | 3/1953 |
| JP | 2004077976 | 3/2004 |
| NR | 91642 | 5/1958 |
| WO | WO 97/07879 A1 | 3/1997 |
| WO | WO2009/064592 | 5/2009 |
| WO | WO2009/075748 | 6/2009 |

OTHER PUBLICATIONS

Alder et. al., The Alkyl Esters of Phosphoric Acid, Willard Chem, Indus., 1942, vol. 51, 516-522.

(Continued)

*Primary Examiner*—Vickey Nerangis

(57) ABSTRACT

One aspect of the invention is to provide a composition comprising a titanium dioxide particle having on the surface of said particle a substantially encapsulating layer comprising a pyrogenically-deposited metal oxide; said substantially encapsulating layer having on its surface at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof. Another aspect of the invention is to provide processes for producing said composition.

12 Claims, No Drawings

OTHER PUBLICATIONS

ASTM Method G26-92, Standard Practice for Operating Light-Exposure Apparatus (Xenon-ARC Type) With and Without Water for Exposure of Nonmetallic Materials, 0-(Annual Book of ASTM Standards), 1999, vol. 6.01, 310-318.

Powell et. al., Synthesis of Alumina/Silica-Coated Titania Particles in an Aerosol Flow Reactor, Chem. Mater., 1997, vol. 9:685-693.

European Search Report Dated Dec. 20, 2005 Application No. 05009021.6.

Bergna & Roberts "Colloidal Silica Fundamentals and Applications" pp. 277-286 (2006).

L. T. Zhuravlev "Concentration of Hydroxyl Groups on the Surface of Amorphous Silicas," Langmuir 1987, 3, 316-318.

PREPARATION OF ORGANIC ADDITIVE-TREATED, PYROGENIC SILICA-ENCAPSULATED TITANIUM DIOXIDE PARTICLES

CROSS-REFERENCE TO RELATED APPLICATIONS

This application claims the benefit of U.S. Provisional Application No. 60/565,773, filed Apr. 27, 2004 incorporated by reference herein in its entirety.

FIELD OF THE INVENTION

This invention relates to a process for producing titanium dioxide particles suitable for incorporation at high loadings into polymer matrices, said particles possessing the attributes of a high degree of polymer additive derived discolouration resistance, good photodurability, excellent volatilization resistance, high dispersibility, good processing in high load polymer matrices, excellent optical properties, and high bulk density.

BACKGROUND OF THE INVENTION

The surface application of certain organosilicon compounds to initially untreated, chloride process-derived titanium dioxide particles has been described for allowing incorporation of the particles at high loadings, high processing rates and with a high degree of dispersion into various thermoplastic polymer matrices, particularly polyolefin derived matrices, see for example, U.S. Pat. Nos. 5,607,994; 5,631,310; 5,889,090; and 5,959,004. In addition, the treatment has been known to allow the subsequent production of finished articles, e.g., films, which are unaffected by the development of imperfections because of the release of particle associated volatiles. During high temperature thin film fabrication, these imperfections are typically referred to as lacing.

However, a problem associated with use of these surface treated particles is their inability to varying degrees to resist the UV light induced formation of chromophores (typically yellow) when the particles are incorporated into polymer matrices possessing (in concert) certain types of phenolic stabilizers (such as, for example, butylated hydroxytoluene or butylated hydroxyanisole) and hindered amine light stabilizers (such as, for example, bis(2,2,6,6-tetramethyl-4-piperidinyl)sebacate). Another problem is their inability to yield particle/polymer composites that possess any significant photodurability, that is, resistance of the particle/polymer composite to UV light induced degradation.

Substantially encapsulating the particles, before the addition of any organic surface treatment, with certain metal oxides (for example, silica, alumina, or mixtures thereof) deposited in an aqueous environment by either batch or continuous operations has been described to solve the problems of chromophore formation and photodurability, see, for example, U.S. Pat. Nos. 3,437,502; 5,993,533; and 6,783,586. However, a serious disadvantage of this solution is that the resulting metal oxide shell is prone to moisture retention and/or moisture generation which can, under high temperature fabrication conditions, result in the formation of the aforementioned polymer matrix imperfections, e.g., lacing in high temperature thin film fabrication.

It has now been found that the above-described problems and disadvantages can be significantly overcome and the highly desirable benefits associated with the aforementioned organosilane surface treatment technology retained by coupling an organosilane surface treatment with the encapsulation technology described in US Patent Publication No. 2003/0051635, incorporated herein by reference in its entirety. The encapsulation technology described in US Patent Publication No. 2003/0051635 encapsulates titanium dioxide particles with a thin shell of pyrogenically deposited silica. It has surprisingly been found that combining these techniques allows the preparation, using standard commercial production equipment, of titanium dioxide particles possessing the attributes of a high degree of polymer additive derived discolouration resistance, good photodurability, excellent volatilization resistance, high dispersibility, good processing in high load polymer matrices, excellent optical properties, and high bulk density.

SUMMARY OF THE INVENTION

One aspect of this invention is to provide a composition comprising a titanium dioxide particle having on the surface of said particle a substantially encapsulating layer comprising a pyrogenically-deposited metal oxide; said substantially encapsulating layer having on its surface at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof.

In a preferred embodiment, the at least one organic surface treatment material is an organo-silane having the formula:

$$R^5_x SiR^6_{4-x}$$

wherein
 $R^5$ is a nonhydrolyzable alkyl, cycloalkyl, aryl, or aralkyl group having at least 1 to about 20 carbon atoms;
 $R^6$ is a hydrolyzable alkoxy, halogen, acetoxy, or hydroxy group; and
 x=1 to 3.

Octyltriethoxysilane is a preferred organo-silane.

Also provided are pigments and thermoplastic resins comprising a composition of the invention.

Another aspect of the invention is to provide a method for producing high lacing resistant, semi-photodurable, stabilizer-derived yellowing resistant titanium dioxide particles comprising:

(a) providing titanium dioxide particles having on the surface of said particles a substantially encapsulating layer comprising a pyrogenically-deposited metal oxide;

(b) treating said particles with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof; and (c) optionally, repeating step (b).

A further aspect is to provide a method for producing high lacing resistant, semi-photodurable, stabilizer-derived yellowing resistant titanium dioxide particles comprising:

(a) providing a slurry comprising titanium dioxide particles having on the surface of said particles a substantially encapsulating layer comprising a pyrogenically-deposited metal oxide;

(b) adjusting the pH of the slurry to aid in neutralization of residual chlorine;

(c) adjusting the pH of the slurry to aid in filtration of the slurry;

(d) treating the slurry with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(e) filtering the slurry to produce a filter cake;

(f) optionally, during or after step (e), treating the filter cake with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(g) drying the filter cake;

(h) optionally, during or after step (g), treating the filter cake with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(i) deagglomerating titanium dioxide particles from the treated filter cake; and (j) optionally, during or after step (i), treating the titanium dioxide particles with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof.

Also provided is a method for producing high lacing resistant, semi-photodurable, stabilizer-derived yellowing resistant titanium dioxide particles comprising:

(a) providing a slurry comprising titanium dioxide particles having on the surface of said particles a substantially encapsulating layer comprising a pyrogenically-deposited metal oxide;

(b) adjusting the pH of the slurry to aid in neutralization of residual chlorine;

(c) adjusting the pH of the slurry to aid in filtration of the slurry;

(d) filtering the slurry to produce a filter cake;

(e) during or after step (d), treating the filter cake with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(f) drying the filter cake;

(g) optionally, during or after step (f), treating the filter cake with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(h) deagglomerating titanium dioxide particles from the treated filter cake; and (i) optionally, during or after step (h), treating the titanium dioxide particles with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof.

A further aspect is to provide a method for producing high lacing resistant, semi-photodurable, stabilizer-derived yellowing resistant titanium dioxide particles comprising:

(a) providing a slurry comprising titanium dioxide particles having on the surface of said particles a substantially encapsulating layer comprising a pyrogenically-deposited metal oxide;

(b) adjusting the pH of the slurry to aid in neutralization of residual chlorine;

(c) adjusting the pH of the slurry to aid in filtration of the slurry;

(d) filtering the slurry to produce a filter cake;

(e) drying the filter cake;

(f) during or after step (e), treating the filter cake with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof;

(g) deagglomerating titanium dioxide particles from the treated filter cake; and (h) optionally, during or after step (g), treating the titanium dioxide particles with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof.

Another aspect is to provide a method for producing high lacing resistant, semi-photodurable, stabilizer-derived yellowing resistant titanium dioxide particles comprising:

(a) providing a slurry comprising titanium dioxide particles having on the surface of said particles a substantially encapsulating layer comprising a pyrogenically-deposited metal oxide;

(b) adjusting the pH of the slurry to aid in neutralization of residual chlorine;

(c) adjusting the pH of the slurry to aid in filtration of the slurry;

(d) filtering the slurry to produce a filter cake;

(e) drying the filter cake;

(f) adding the filter cake into a micronizer;

(g) adding to the micronizer feed block or to conveyed particles up to about several feet past the exit of the micronizer at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof; and (h) optionally, treating the micronized particles with at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, or a mixture thereof.

Other objects and advantages of the present invention will become apparent to those skilled in the art upon reference to the detailed description that hereinafter follows.

DETAILED DESCRIPTION OF THE INVENTION

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

"Substantially encapsulating layer", as used herein, means that the surface of the titanium dioxide particle is predominately covered with a layer of pyrogenic metal oxide.

Titanium dioxide particles suitable for use in the invention are those that have been substantially encapsulated with a pyrogenic metal oxide. Methods such as, for example, those disclosed in co-owned, co-pending U.S. Patent Publication No. 2003/0051635, incorporated herein by reference, are particularly suitable for producing titanium dioxide particles substantially encapsulated with a pyrogenic metal oxide.

The composition of the oxide treatment deposited on the titanium dioxide particles is an amorphous pyrogenically-deposited metal oxide. Preferably, the pyrogenically-deposited metal oxide is silica, alumina, zirconia, phosphoria, boria, or mixtures thereof. Most preferred is silica, such as pyrogenic silica deposited by a process disclosed in U.S. Patent Publication No. 2003/0051635. The thickness of the treatment layer deposited is typically in a range of from about 2 to about 6 nm, but any amount of deposited pyrogenic metal oxide is suitable. The particles are typically more than 99% rutile.

The method of adding the at least one organic surface treatment material to the titanium dioxide particles substantially encapsulated with pyrogenically-deposited metal oxide of the present invention is not especially critical, and said TiO2 particles may be treated with the at least one organic surface treatment material in a number of ways. For example, the at least one organic surface treatment material can be added either neat or via solution to said TiO2 particles while said particles are either in a dry state or in a wet state. Examples involving the former state include, but are not limited to, the addition of said material (1) to conveyed particles via injector mixer technology such as that described in U.S. Pat. No. 4,430,001 or as described in WO 97/07879 published Mar. 6, 1997, and assigned to E.I. du Pont de Nemours and Company or (2) to particles undergoing deagglomeration in a micronizer (said material typically added to the micronizer feed block or to conveyed pigment up to about several feet past the exit of the micronizer) or in a dry media mill. Examples involving the latter state include, but are not limited to, the addition of said material (1) to particles present in slurry form either separate from or during filtration, (2) to particle wet cake after filtration but before drying, (3) to particles that are being dried by, for example, flash dryer or spray drier based techniques or (4) to particles undergoing deagglomeration via wet media milling techniques. In addition, the at least one organic surface treatment material can be added in portions at different processing stages. For example, one-half of said material can be added during a drying step and the remaining half at a subsequent stage such as during a deagglomeration operation such as during micronizing.

Suitable organic surface treatment materials include, but are not limited to, for example, organo-silanes; organo-siloxanes; fluoro-silanes; organo-phosphonates; organo-phosphoric acid compounds such as organo-acid phosphates, organo-pyrophosphates, organo-polyphosphates, and organo-metaphosphates; organo-phosphinates; organo-sulfonic compounds; hydrocarbon-based carboxylic acids and associated derivatives and polymers; hydrocarbon-based amides; low molecular weight hydrocarbon waxes; low molecular weight polyolefins and co-polymers thereof; hydrocarbon-based polyols and derivatives thereof; alkanolamines and derivatives thereof; and commonly utilized organic dispersing agents; all the above utilized either individually or as mixtures, applied in concert or sequentially. Preferably, the surface of the titanium dioxide particles substantially encapsulated with a pyrogenically-deposited metal oxide are treated with an organo-silane.

Suitable organo-silanes for use in the practice of this invention include silanes disclosed in U.S. Pat. No. 5,560,845 issued to Birmingham, Jr. et al. on Oct. 1, 1996, having the general formula $$SiR^1R^2R^3R^4 \quad (I)$$

in which at least one R is a non-hydrolyzable organic group, such as alkyl, cycloalkyl, aryl, or aralkyl, having 1-20 carbon atoms, preferably 4-20 carbon atoms, most preferably 6-20 carbon atoms, and at least one R is a hydrolyzable group such as alkoxy, halogen, acetoxy, or hydroxy. The other two R are, independently, hydrolyzable or non-hydrolyzable as above. It is preferred that at least two, and especially that three, of the R are hydrolyzable. The non-hydrolyzable R can be fully or partially fluorine substituted. A silane having the foregoing description is herein called "organo-silane" in reference to the non-hydrolyzable R group(s). Organo-silanes may be linear or branched, substituted or unsubstituted, and saturated or unsaturated. Preferably, non-hydrolyzable R are non-reactive. Alkyl, cycloalkyl, aryl, and aralkyl are preferred non-hydrolyzable R, with alkyl being most preferred, including the possibility of any of these groups being fully or partially fluorine substituted. When the hydrolyzable R are identical, the organo-silane can be represented by $$R^5_x SiR^6_{4-x} \quad (II)$$

in which $R^5$ is non-hydrolyzable and $R^6$ is hydrolyzable as defined above and x=1-3. Preferred $R^6$ include methoxy, ethoxy, chloro, and hydroxy. Ethoxy is especially preferred for ease of handling. Preferred organo-silanes include octyltriethoxysilane, nonyltriethoxysilane, decyltriethoxysilane, dodecyltriethoxysilane, tridecyltriethoxysilanek, tetradecyltriethoxysilane, pentadecyltriethoxysilane, hexadecyltriethoxysilane, heptadecyltriethoxysilane and octadecyltriethoxysilane. Mixtures of organo-silanes can be used.

In embodiments utilizing organo-silanes represented by Formula II, preferred silanes are $R^5$=8-18 carbon atoms; $R^6$=ethoxy; and x=1 to 3. The $R^5$=8-18 carbon atoms are preferred, for example for enhanced processability. $R^6$=ethoxy is preferred for ease of handling. Most preferred is octyltriethoxysilane.

Suitable organo-siloxanes for use in the practice of this invention are of the general formula $$[R^7_n SiO_{(4-n)/2}]_m \quad (III)$$

in which $R^7$ may be organic or inorganic, n=0-3, and m≧2. Polydimethylsiloxane (PDMS), terminated in a multitude of different ways, for example, by trimethylsilyl functionality, and the like are the preferred polysiloxanes. Additionally useful organo-siloxanes include, for example, polymethylhydrosiloxane (PMHS) and polysiloxanes derived from the functionalization (by hydrosilylation) of PMHS with olefins.

Organo-silanes and polysiloxanes are commercially available or can be prepared by processes known in the art. See, for example, S. Pawlenko, "Organosilicon Compounds", G. Thieme Verlag, New York (1980).

Suitable organo-phosphonates for use in the practice of this invention are disclosed in U.S. Pat. No. 5,837,049 issued to Watson et al. on Nov. 17, 1998, and have the general formula

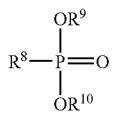

(IV)

in which $R^8$ is an alkyl group or a cycloalkyl group containing 1 to 22 carbon atoms and $R^9$ and $R^{10}$ are each, independently, hydrogen, an alkyl group, a cycloalkyl group, an aryl group, or an aralkyl group.

Preferably, $R^8$ contains from 1 to 20, more preferably 4-20, and even more preferably 6-20 carbon atoms and is a straight chain alkyl group. However, organo-phosphonates possessing linear or branched, substituted or unsubstituted and saturated and unsaturated $R^8$, $R^9$ and $R^{10}$ functionality are suitable for use. Organo-phosphonates of use include n-octylphosphonic acid and its esters, n-decylphosphonic acid and its esters, 2-ethylhexylphosphonic acid and its esters, and camphyl phosphonic acid and its esters.

When $R^9$ and $R^{10}$ are both hydrogen, the above Formula IV represents an organo-phosphonic acid, and when at least one of $R^9$ and $R^{10}$ is a hydrocarbyl group, the formula represents an ester of an organo-phosphonic acid. In the case of esters, $R^9$ and $R^{10}$ preferably contain up to 10 carbon atoms and more preferably up to 8 carbon atoms (i.e., the ester is an ester of an alcohol containing up to 10, and preferably up to 8 carbon atoms). $R^9$ and $R^{10}$ can be different but frequently are the same. Suitable esters include ethyl esters, butyl esters, octyl esters, cyclohexyl esters, and phenyl esters.

In addition to the above described organo-phosphonates, one can also envision utilizing in the practice of this invention organo-phosphonate derivatives possessing hydrolyzable halogen functionality examples of which include, but are not limited to, n-octylphosphonic dichloride, n-decylphosphonic dichloride and 2-ethylhexylphosphonic dichloride.

Suitable organo-phosphoric acid compounds for use in the practice of this invention include an organo-acid phosphate, an organo-pyrophosphate, an organo-polyphosphate, an organo-metaphosphate, or a salt of any of the aforementioned organo-phosphoric acid compounds as disclosed in U.S. Pat. No. 6,713,543 issued to El-Shoubary et al. on Mar. 30, 2004. Suitable organo-acid phosphates have the general formula $$(R^{11}-O)_y PO(OH)_z \quad (V)$$

wherein y=1 or 2; z=3−y; and $R^{11}$ is an organic group having from 2 to 22 carbon atoms.

The phrase "organo-acid phosphate" as used herein refers to a compound that may be represented by Formula V. In the organo-acid phosphate of Formula V, the organic groups may be linear or branched, substituted or unsubstituted, and saturated or unsaturated. Preferably $R^{11}$ is a linear hexyl- or octyl-aliphatic group or a branched hexyl- or octyl-aliphatic group.

Suitable organo-pyrophosphate or organo-polyphosphate compounds may be represented by the formula:

$$R^{12}{}_a - P_{(a-2)} O_{4+[3(a-3)]} \quad (VI)$$

wherein a=4-14; and each $R^{12}$ is an organic group having from 2 to 22 carbon atoms or hydrogen and within any one molecule, any two or more $R^{12}$ groups may be the same provided that at least one of the $R^{12}$ groups is not hydrogen.

The symbol $R^{12}$ as used in Formula VI denotes any organic group that contains from 2 to 22 carbon atoms or hydrogen. Within any molecule the $R^{12}$ groups may all be the same moiety or they may be different moieties. These organic groups may be linear or branched, substituted or unsubstituted, and saturated or unsaturated. If the $R^{12}$ groups are all the same moieties, then they cannot be hydrogen. Preferably at least one of the $R^{12}$ groups is hydrogen and at least one of the $R^{12}$ groups will be linear hexyl or octyl aliphatic groups or branched hexyl or octyl aliphatic groups. Examples of organopyrophosphate acid compounds and organopolyphosphate acid compounds include caprylpyrophosphate, 2-ethylhexylpyrophosphate, dihexylpyrophosphate, dihexylammoniumpyrophosphate, dioctylpyrophosphate, diisooctylpyrophosphate, dioctyltriethanolaminepyrophosphate, bis(2-ethylhexyl)pyrophosphate, bis(2-ethylhexyl)sodium pyrophosphate, tetraethylpyrophosphate, tetrabuytlpyrophosphate, tetrahexylpyrophosphate, tetraoctylpyrophosphate, pentahexyltripolyphosphate, pentaoctyltripolyphosphate, tetrahexyl sodium tripolyphosphate, tetrahexylammoniumtripolyphosphate, pentahexyl sodium tetrapolyphosphate, trioctyl sodium tetrapolyphosphate, trioctyl potassium tetrapolyphosphate, hexabutyltetrapolyphosphate, hexahexyltetrapolyphosphate, and hexaoctyltetrapolyphosphate.

Suitable organo-metaphosphate compounds may be represented by the formula:

$$(R^{13}PO_3)_b \quad (VII)$$

wherein b=1-14, and each $R^{13}$ is an organic group having from 2 to 22 carbon atoms or hydrogen and within any one molecule, any two or more $R^{13}$ groups may be the same provided that at least one of the $R^{13}$ groups is not hydrogen.

The symbol $R^{13}$ as used in Formula VII denotes any organic group that contains from 2 to 22 carbon atoms or hydrogen. These organic groups may be linear or branched, substituted or unsubstituted, and saturated or unsaturated. "b" may be from about 1 to about 14, and preferably "b" is from about 4 to about 14. Within any molecule, the $R^{13}$ groups may all be the same moiety or they may be different moieties. If the $R^{13}$ groups are all the same moieties, then they cannot be hydrogen. Preferably at least one of the $R^{13}$ groups will be a linear hexyl or octyl aliphatic group or a branched hexyl or octyl aliphatic group. Examples of organo-metaphosphates include ethylmetaphosphate, propylmetaphosphate, butylmetaphosphate, hexylmetaphosphate, and octylmetaphosphate.

The organo-phosphoric acids of the present invention may be utilized in their acidic or salt forms. Examples of salts useful with the present invention are the potassium, sodium, ammonium, and aluminum salts and salts formed with alkanolamines such as triethanolamine of the substances identified by Formula V, Formula VI, or Formula VII.

Organo-acid phosphates are readily available commercially or may be prepared by procedures known or knowable to those skilled in the art such as those procedures disclosed in U.S. Pat. No. 4,350,645, issued to Kurosaki et al. on Sep. 21, 1982. Organo-pyrophosphates and organo-polyphosphates are readily available commercially or produced according to the procedures that are known or easily knowable to persons skilled in the art. Organo-metaphosphates may also be produced according to the procedures that are known or easily knowable to persons skilled in the art. Examples of these procedures for synthesizing organo-pyrophosphates, organo-polyphosphates, and organo-metaphosphates are described in Alder, Howard and Woodstock, Willard Chem, Indus., 1942, 51:516.

Suitable organo-phosphinates for use in the practice of this invention include those which are represented by the general formulas

$$R^{14}P(O)H(OR^{15}) \qquad (VIII)$$

and

$$R^{16}R^{17}P(O)(OR^{18}) \qquad (IX)$$

in which $R^{14}$, $R^{16}$, $R^{17}$ are alkyl groups or cycloalkyl groups containing 1 to 22 carbon atoms and $R^{15}$ and $R^{18}$ are each, independently, hydrogen, an alkyl group, a cycloalkyl group, an aryl group, or an aralkyl group. Preferably, $R^{14}$, $R^{16}$, $R^{17}$ contain from 1 to 20, more preferably 4-20, and even more preferably 6-20 carbon atoms and are straight chain alkyl groups. However, organo-phosphinates possessing linear or branched, substituted or unsubstituted and saturated and unsaturated $R^{14}$, $R^{15}$, $R^{16}$, $R^{17}$, and $R^{18}$ functionality are suitable for use. $R^{16}$ and $R^{17}$ can be different but frequently are the same. Phosphorus compounds of use include, but are not limited to, n-hexylphosphinic acid and its esters (VIII), n-octylphosphinic acid and its esters (VIII), di-n-hexylphosphinic acid and its esters (IX) and di-n-octylphosphinic acid and its esters (IX).

When $R^{15}$ and $R^{18}$ are both hydrogen the above formula represents an organo-phosphinic acid and when at least one of $R^{15}$ and $R^{18}$ is a hydrocarbyl group the formula represents an ester of an organo-phosphinic acid. In the case of esters, preferably, $R^{15}$ and $R^{18}$ contain up to 10 carbon atoms and more preferably up to 8 carbon atoms (i.e. the ester is an ester of an alcohol containing up to 10, and preferably up to 8 carbon atoms). Suitable esters include ethyl esters, butyl esters, octyl esters, cyclohexyl esters, and phenyl esters.

In addition to the above described organo-phosphinates, one can also envision utilizing in the practice of this invention organo-phosphinate derivatives possessing hydrolyzable halogen functionality examples of which include, but are not limited to, chloroethylphosphine oxide and chlorodiethylphosphine oxide.

Organo-sulfonic compounds, as disclosed in U.S. Pat. No. 6,646,037 issued to El-Shoubary et al. on Nov. 11, 2003, may in general be represented by Formula X, which includes not only organo-sulfonic acids, but also their salts. These organo-sulfonic compounds of Formula X may be synthesized de novo or obtained from commercial sources. Formula X is:

$$(R^{19}SO_3)_cM^{c+} \qquad (X)$$

where $R^{19}$ represents a saturated, unsaturated, branched, linear, or cyclic organic group having from 2 to 22 carbon atoms; c equals 1, 2, 3, or 4; and M represents hydrogen, a metal ion, ammonium ion or organoammonium ion such as protonated triethanolamine. Preferably, if M is a metal ion, it is a metal ion with a valence of +1, +2, +3, or +4 such as $Na^{1+}$, $Ca^{2+}$, $Mg^{2+}$, $Al^{3+}$, or $Ti^{4+}$. Preferably, $R^{19}$ is hexyl-, octyl-, or 2-ethylhexyl-.

Suitable hydrocarbon-based carboxylic acids for use in the practice of this invention include those that possess linear or branched, substituted or unsubstituted and saturated or unsaturated (including aromatic) functionality as well as one or more carboxylic acid groups. Preferably, said acids will possess about 2-28, more preferably 2-18, and most preferably 2-12 carbon atoms. Said acids can be applied to the particle surface both as the free acid or as a neutralized salt. Examples of suitable acids include maleic, malonic, fumaric, benzoic, phthalic, stearic, oleic, and linoleic.

Also suitable for use in the practice of this invention are esters and partial esters formed by the reaction of the above described hydrocarbon-based carboxylic acids with organic hydroxy compounds that possess linear or branched, substituted or unsubstituted, and saturated or unsaturated (including aromatic) functionality and, typically, 1 to 6 hydroxyl (OH) groups. Examples of appropriate non-aromatic hydroxy compounds include, but are not limited to, ethylene glycol, propylene glycol, trimethylolpropane, diethanolamine, triethanolamine, glycerol, hexanetriol, erythritol, mannitol, sorbitol, and pentaerythritol. Examples of appropriate aromatic hydroxy compounds include, but are not limited to, bisphenol A, hydroquinone, and phloroglucinol. Said esters and partial esters are described in U.S. Pat. No. 5,288,320 issued to Decelles on Feb. 22, 1994.

Polyesters derived from the self-condensation of, for example, 12-hydroxystearic acid or from, for example, the condensation of a dicarboxylic acid containing compound with a dihydroxyl containing compound can also be utilized for the current invention.

Suitable hydrocarbon-based amides for use in the practice of this invention include those that possess linear or branched, substituted or unsubstituted and saturated or unsaturated (including aromatic) functionality. Preferably, said amides will possess about 8-22, more preferably 12-22, and most preferably 18-22 carbon atoms. Examples of suitable amides include stearamide, oleamide, and erucamide.

Also suitable for use in the practice of this invention are surface treatments derived from relatively low molecular weight hydrocarbon waxes and polyolefins, the latter either homopolymeric, for example, polyethylene or polypropylene, or derived from the co-polymerization of, for example, ethylene with one or more of propylene, butylene, vinylacetate, acrylates, or acrylamide.

In addition to the above described additives, one can also utilize as particle surface treatments in the practice of this invention hydrocarbon-based polyols, alkanolamines, and derivatives thereof, for example, esters and partial esters. Examples of said polyols include species such as glycerol and the commonly utilized particle grinding aids trimethylolethane and trimethylolpropane. Examples of said alkanolamines include diethanolamine and triethanolamine.

Common organic dispersing agents that are of use in the practice of this invention include, but are not limited to, citric acid, polyacrylic acid, and polymethacrylic acid as well as the more complex, specialty polymeric organic dispersing agents possessing anionic, cationic, zwitterionic, or non-ionic functionality and whose structures are typically trade secrets but are usually derived from linear, comb, star, brush, or dendrimer based polymer chain and pendant substituent morphologies.

Note that, in conjunction with the above, organic surface treatments may also be used various inorganic based dispersing aids which are usually phosphate, polyphosphate, pyrophosphate, and metaphosphate derived and are typically added, either as the acids or associated salts, to particle slurries.

Mixtures of organic surface treatment materials are contemplated, including mixtures of organic surface treatment materials from within one class of compounds, for example mixtures of organo-silanes, or mixtures of organic surface treatment materials from within two or more classes, for examples mixtures organo-silanes and organo-phosphonates.

Weight content of the organic surface treatment material, based on total $TiO_2$, is typically about 0.05 to about 5 weight %, preferably about 0.1 to about 1.5 weight %. In excess of 5 weight % may be used.

While titanium dioxide particles substantially encapsulated with a pyrogenically-deposited metal oxide can be treated with only one organic surface treatment material or mixtures of said material added in a single treatment step, alternative embodiments contemplate subsequent treatment of said titanium dioxide particles with additional organic surface treatment materials. Thus, for example, titanium dioxide particles previously treated with one organic surface treatment material can be treated with the same organic surface treatment material repeating the previous treatment method or using another treatment method. Alternatively, a different organic surface treatment material can be added through an identical treatment method or through another treatment method. Treatments beyond one additional treatment are contemplated.

Weight content of the organic surface treatment material in layers beyond the first layer of organic surface treatment material, based on total $TiO_2$, is typically about 0.01 to about 1.0 weight %, but higher amounts are acceptable.

As described above for the initial treatments of organic surface treatment material, the method of adding additional treatments of organic surface treatment materials is not especially critical, and any of the aforementioned methods may be used for subsequent treatments. In a preferred embodiment, the additional layers of organic surface treatment material beyond the first layer of organic surface treatment material are added via the use of an apparatus for coating particles, such as powdery or granular materials, as described in WO 97/07879 published Mar. 6, 1997, and assigned to E.I. du Pont de Nemours and Company, or as described in U.S. Pat. No. 4,430,001. Use of said apparatus for encapsulating titanium dioxide particles with the organic surface treatment material involves metering a liquid composition comprising the organic surface treatment material, where the liquid composition is either a solution, slurry, or melt, into a flow restrictor and injecting a gas stream through the flow restrictor concurrently with the metering of the liquid composition to create a zone of turbulence at the outlet of the flow restrictor, thereby atomizing the liquid composition. The gas stream can be heated if necessary. Dried titanium dioxide particles substantially encapsulated with a pyrogenically-deposited metal oxide can be added to the zone of turbulence concurrently with the metering of the liquid composition and the injection of the heated gas to mix the titanium dioxide particles with the atomized liquid composition. Alternatively, said titanium dioxide particles can be added downstream of the zone of turbulence. The mixing at the zone of turbulence treats the titanium dioxide particles with the organic surface treatment material.

Pigments disclosed herein can be employed to readily and uniformly fill a wide variety of thermoplastic resins, such as those disclosed in U.S. Pat. No. 5,397,391. These include, but are not limited to, such well known classes of thermoplastic resins as polyolefin resins, acrylic resins, polyester resins, polyamide resins, epoxy resins, phenolic resins, poly(vinylaromatic) resins, poly(vinylhalide) resins, polycarbonate resins, fluoropolymer resins, elastomeric polymer resins, polyurethaneurea resins, polyurethane resins, polyacetal resins, polyimide resins, polyetherimide resins, polyamideimide resins, polyetheretherketone resins, polyetherketoneketone resins, liquid crystal polymer resins and the like, and blends thereof. Representative, but non-limiting, examples of these various classes of thermoplastic resins include polyolefin resins such as polyethylene including, but not limited to, polyethylene made with conventional, high activity and metallocene-based catalyst systems such as, for example, ultra low density polyethylenes (ULDPE), very low density polyethylenes (VLDPE), linear low density polyethylenes (LLDPE), low density polyethylenes (LDPE), medium density polyethylenes (MDPE), high density polyethylenes (HDPE), high molecular weight high density polyethylenes (HMWHDPE), ultra high molecular weight high density polyethylenes (UHMWHDPE), ethylene/vinyl acetate (EVA) co-polymer, ethylene/methacrylic acid (EMA) co-polymer, and blends thereof; polypropylene including homopolymers, copolymers, compounded and in situ thermoplastic olefins, and the like, and blends thereof; acrylic resins such as poly(acrylic acid), poly(methacrylic acid), poly(methylacrylate), poly(methylmethacrylate), and the like, and blends thereof; polyester resins such as poly(ethylene terephthalate), poly(butylene terephthalate), poly(cyclohexylene-dimethylene terephthalate), poly(trimethylene terephthalate), poly(ethylene naphthalate), and the like, and blends thereof; polyamide resins such as nylon 6, nylon 6,6, nylon 6/6,6 co-polymer, nylon 11, nylon 6,10, nylon 6,12, amorphous nylon, and the like, and blends thereof; epoxy resins such as poly(epichlorohydrin/bisphenol A) and the like and esters thereof such as those prepared by the esterification of poly(epichlorohydrin/bisphenol A) with a fatty acid, resin acid, tall oil acid or mixtures thereof; phenolic resins such as those derived from the reaction of formaldehyde with phenol, resorcinol, cresol, p-phenylphenol, and the like, and blends thereof; poly(vinylaromatic) resins such as polystyrene and copolymers thereof such as poly(styrene-acrylonitrile), poly(acrylonitrile-styrene-butadiene), poly(acrylonitrile-styrene-acetate), and the like, and blends thereof; poly(vinylhalide) resins, such as poly(vinylchloride), poly(vinylchloride/vinylidene chloride), and the like, and blends thereof; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with dimethyl or diphenyl carbonate to produce bisphenol A polycarbonate, and blends thereof; fluoropolymer resins, such as tetrafluoroethylene/perfluoro(propyl vinyl ether) (PFA) co-polymer, polyvinyl fluoride (PVF), polyvinylidene fluoride (PVDF), tetrafluoroethylene/hexafluoropropylene (FEP) co-polymer, ethylene/tetrafluoroethylene/perfluorobutyl ethylene (EFTE) ter-polymer, ethylene/chlorotrifluoroethylene (ECTFE) co-polymer, and the like, and blends thereof; elastomeric polymer resins such as natural rubber, synthetic rubber, acrylics, chlorosulfonated polyethylene, neoprene, silicones, urethanes, and the like, and blends thereof; polyurethaneurea resins such as polyether- and polyester-based spandex, and the like, and blends thereof; polyurethane resins obtained by the reaction of di- or poly-functional hydroxy compounds such as glycols or hydroxyl terminated polyesters and polyethers with di- or poly-isocyanate containing compounds, and the like, such as, for example, 4,4'-dicyclohexylmethane diisocyanate (H12MDI), hexamethyl diisocyanate (HDI), isophorone diisocyanate (IPDI), methylene diphenyl diisocyanate (MDI), toluene diisocyanate (TDI), tetramethylxylene diisocyanate (TMXDI), o-tolidine diisocyanate (TODI), 1,4-cyclohexane diisocyanate (CHDI), and blends thereof; polyacetal resins such as polyformaldehyde, copolymers of formaldehyde with cyclic ethers such as, for example, ethylene oxide, 1,3-dioxolane, and the like, and blends thereof; polyimide resins obtained by the reaction of an aromatic dianhydride such as pyromellitic dianhydride with an aromatic diamine such as p-phenylenediamine, and the like, and blends thereof; polyetherimide resins obtained by the reaction of an aromatic dianhydride such as pyromellitic dianhydride with an aromatic diamine such as 4,4'-oxydianiline, and the like, and blends thereof; polyamideimide resins obtained by the reaction of an aromatic anhydride acid chloride such as trimellitic anhydride acid chloride with an aliphatic diamine such as 1,4-cyclohexanediamine, and the like, and blends thereof; polyetheretherketone resins obtained by the reaction of an dihaloaromatic ketone such as bis(4-chlorophenyl)ketone with an aromatic diol such as hydroquinone, and the like, and blends thereof; polyetherketoneketone resins obtained by the reaction of an diaromatic ether such as diphenyl ether with an aromatic diacid chloride such as terephthaloyl chloride, and the like, and blends thereof; and liquid crystal polymer resins such as those as described in U.S. Pat. No. 6,492,463, and the like, and blends thereof.

Particles comprising compositions of the invention may be used to fill thermoplastics in any of the customary ways such as, for example, extrusion applications including, for example, cast film extrusion, blown film extrusion, slit film extrusion, sheet and profile extrusion, fiber and filament extrusion, and wire coating extrusion; molded article applications including, for example, injection molding, blow molding, and rotational molding; and post-article forming coating applications such as, for example, powder coating, roll-on coating, brush-on coating, trowel-on coating, and spray-on coating.

In cast film extrusion, useful thermoplastics include, for example, polyethylenes, polypropylenes, polyesters, polyvinyl chlorides, styrenes, polyamides, and polycarbonates.

In blown film extrusion, useful thermoplastics include, for example, polyethylenes and polypropylenes.

In slit film extrusion, useful thermoplastics include, for example, polypropylenes.

In sheet and profile extrusion, useful thermoplastics include, for example, polyethylenes, polypropylenes, polyesters, polyvinyl chlorides, styrenes, fluoropolymers, polyamides, polycarbonates, elastomeric polymers, polyimides, polyetherimides, polyamideimides, polyetheretherketones, polyetherketoneketones, polyphenylene sulfides, and polyacetals.

In fiber and filament extrusion, useful thermoplastics include, for example, polypropylenes, polyesters, polyamides, and polyurethaneureas and elastomeric polymers.

In wire coating extrusion, useful thermoplastics include, for example, polyethylenes, polyvinyl chlorides, and fluoropolymers, polyimides, polyetherimides, and elastomeric polymers.

In injection molding, useful thermoplastics include, for example, polyethylenes, polypropylenes, polyesters, polyvinyl chlorides, styrenes, polyamides, polycarbonates, urethanes, acetals, polyphenylene sulfides, elastomeric polymers, polyimides, polyetherimides, polyamideimides, polyetheretherketones, and liquid crystalline polymers.

In blow molding, useful thermoplastics include, for example, polyethylenes, polypropylenes, polyesters, polyvinyl chlorides, polyamides, and polycarbonates.

In rotational molding, useful thermoplastics include, for example, polyethylenes and polypropylenes.

In post-article forming coatings, useful thermoplastics include, for example, polyethylenes, polyvinyl chlorides, fluoropolymers, elastomeric polymers, and urethanes.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit, and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope, and concept of the invention as defined by the appended claims.

In one embodiment, the invention herein can be construed as excluding any element or process step that does not materially affect the basic and novel characteristics of the composition or process. Additionally, the invention can be construed as excluding any element or process step not specified herein.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modifications of the invention to adapt it to various uses and conditions.

The meaning of abbreviations is as follows: "h" means hour(s), "min" means minute(s), "sec" means second(s), "mL" means milliliter(s), "g" means gram(s), "psi" means pound(s) per square inch, "wt %" means weight percent(age), "Pa" means Pascal, "TGA" means thermogravimetric analysis, "OTES" means octyltriethoxysilane, "~" means approximately, "L" means liters, "° C." means degrees Celsius, "mil" means thousandth of an inch, "° F." means degrees Fahrenheit, "°" means degree(s), "Δ" means delta, "vol %" means volume percent(age), "mm" means millimeter(s), "rpm" means revolutions per minute, and "cm$^3$" means cubic centimeter(s).

Standard Test Methods

Descriptions of the standard test methodologies utilized for the physical characterization of the particles produced by the current invention (except bulk density, see Example 11) are provided below. More specifically:

Carbon analyses were performed on dry particle samples using LECO CNS 2000 or C400 Analyzers (LECO Corporation, St. Joseph, Mich.).

Dispersion analyses, as defined by particle retention on a 500 mesh screen, were performed on 50 wt % polyethylene (NA206, Equistar) masterbatch concentrates (Farrel Banbury® BR1600 produced) containing the particles of interest. Said concentrates were extruded (500 g; Killion ¾ inch single screw extruder, Cedar Grove, N.J.) through a sandwich of fine mesh, metal wire screens (30, 60, 500, 60, 60, 60 mesh) which were then separated, and the magnitude of particles retained on the 500 mesh screen determined using x-ray fluorescence (9200 Series Portable Analyzer, Texas Nuclear Corp., Austin, Tex.).

Vinyl based tint strength and undertone analyses were performed on flexible polyvinylchloride (Coastal Plastics, Hope Valley, R.I.) sheets containing carbon black (0.02 wt %; delivered in dioctyl phthalate; Custom Chemical Co., Elmwood, N.J.) and the particles of interest (3.16 wt %). Said sheets were produced with the aid of a two-roll mill (Kobelco Stewart Bolling, Inc., Hudson, Ohio) and were analyzed (along with a sheet comparably produced using control titanium dioxide particles) colourimetrically using a Hunter Lab Labscan XE (D65 light source; Hunter Associates Laboratory, Inc., Reston, Va.) for their X, Y and Z tristimulus values which were then converted to tint strength and undertone values via Kubelka-Monk methodology.

Analyses for median particle size were performed on sonicated (Sonicator Ultrasonic Liquid Processor Model XL 2020, Heat Systems, Inc., Farmingdale, N.Y.) 3 wt % solids slurries (made up in a 0.2 g/L tetrapotassium pyrophosphate solution) using a Horiba LA-900 laser light-scattering, particle size analyzer (Horiba Instruments, Inc., Irvine, Calif.).

Colour analyses (Commission Internationale de l'Eclairage L*a*b* color coordinates) were performed on compressed solid cakes of particles using a Hunter Lab Labscan XE (10° observer angle, D65 light source; Hunter Associates Laboratory, Inc., Reston, Va.).

Example 1

Approximately 10 metric tons of pigmentary sized titanium dioxide particles (rutile crystalline phase) substantially encapsulated with about 2.0 wt % pyrogenic silica were produced using commercial scale equipment according to the teaching of U.S. Patent Publication No. 2003/0051635. An acidic, aqueous slurry of this material (~380 g/L) was adjusted to a pH value of ~8 (sodium hydroxide) and the residual chlorine present in said slurry neutralized. Said slurry was then acidified temporarily to pH 6 (sulfuric acid), subsequently re-adjusted to pH 8.5 (sodium hydroxide) and finally filtered (rotary drum filter). The produced filter cake was removed from the filter apparatus and dropped onto a conveying screw where neat octyltriethoxysilane (OTES) was added to said cake by peristaltic pump. The resulting pigment/OTES mixture was then fed directly to a spray dryer. The resultant dried product (dryer exit temperature ~100° C.) was then pneumatically conveyed to a fluid energy mill (steam micronizer) where it was subjected to de-agglomeration and subsequently packaged. The resulting material (analyzed in ~1 metric ton increments) possessed OTES-derived carbon values ranging from 0.19 to 0.37 wt %.

Example 2

Approximately 55 metric tons of pigmentary sized titanium dioxide particles (rutile crystalline phase) substantially encapsulated with about 1.5 wt % pyrogenic silica were produced using commercial scale equipment according to the teaching of U.S. Patent Publication No. 2003/0051635. An acidic, aqueous slurry of this material (~350 g/L) was adjusted to a pH value of 4.7 (sodium hydroxide) and the residual chlorine present in said slurry neutralized. Said slurry was then filtered using a press plate filter at pH values between 4.0 (pH reductions performed using hydrochloric acid) and 5.1 (pH increases performed using sodium hydroxide). The produced filter cake was conveyed to a flash dryer where said cake was simultaneously dried and treated with varying amounts of neat octyltriethoxysilane (OTES) which was injected directly into the dryer body. The resultant dried product (dryer exit temperature ~120° C.) was then conveyed to a fluid energy mill (steam micronizer) where it was subjected to de-agglomeration and subsequently packaged. The resulting material (analyzed in ~5 metric ton increments) possessed OTES-derived carbon values ranging from 0.29 to 0.32 wt %. An additional ~260 metric tons of OTES-treated material was produced as described above with the exception that the OTES was added to the dry pigment just prior to said pigment entering the steam micronizer. Material produced using this latter procedure (again analyzed in ~5 metric ton increments) possessed OTES-derived carbon values ranging from 0.26 to 0.38 wt %.

Example 3

Approximately 194 metric tons of pigmentary sized titanium dioxide particles (rutile crystalline phase) substantially encapsulated with about 2.0 wt % pyrogenic silica were produced using commercial scale equipment according to the teaching of U.S. Patent Publication No. 2003/0051635. An acidic, aqueous slurry of this material (~350 g/L) was adjusted to a pH value of 8.0 (sodium hydroxide) and the residual chlorine present in said slurry neutralized. Said slurry was then filtered using a press plate filter at pH values between 4.5 (pH reductions performed using hydrochloric acid) and 8.8 (pH increases performed using sodium hydroxide). The produced filter cake was conveyed to a flash dryer where said cake was simultaneously dried and treated with varying amounts of neat trimethylolpropane (TMP), which was injected directly into the dryer body. The resultant dried product (dryer exit temperature ~120° C.) was then conveyed to a fluid energy mill (steam micronizer) where it was subjected to de-agglomeration and subsequently packaged. The resulting material (analyzed in ~5 metric ton increments) possessed TMP-derived carbon values ranging from 0.12 to 0.29 wt %. The dried product was also found to possess an average silica ($SiO_2$) content of about 1.3 wt % and not the larger value (see above) determined for the titanium particles prior to their TMP treatment. This reduction in silica content was attributed to an inadvertent contamination of the aqueous slurry of the pyrogenic silica-encapsulated titanium dioxide particles with slurry containing titanium dioxide particles that did not possess said encapsulation.

Example 4

Approximately 337 metric tons of pigmentary sized titanium dioxide particles (rutile crystalline phase) substantially encapsulated with about 2.0 wt % pyrogenic silica were produced using commercial scale equipment according to the teaching of U.S. Patent Publication No. 2003/0051635. An acidic, aqueous slurry of this material (~350 g/L) was adjusted to a pH value of 6.5 (sodium hydroxide) and the residual chlorine present in said slurry neutralized. Said slurry was then filtered using a press plate filter at pH values between 3.7 (pH reductions performed using hydrochloric acid) and 4.5 (pH increases performed using sodium hydroxide). The produced filter cake was conveyed to a flash dryer where said cake was simultaneously dried and treated with neat OTES, which was injected directly into the dryer body. The resultant dried product (dryer exit temperature ~120° C.) was then conveyed to a fluid energy mill (steam micronizer) where it was subjected to de-agglomeration and subsequently packaged. Standard characterization of the resulting material (analyzed in ~20 metric ton increments) yielded the data provided in Table 1:

TABLE 1

| Analysis | Data Range |
| --- | --- |
| OTES-derived carbon | 0.30-0.37 wt % |
| Screen pack dispersion, 500 mesh (50 wt % masterbatch) | 13-35 |
| Vinyl tint strength | 107-111 |
| Vinyl undertone | 0.030-0.038 |

TABLE 1-continued

| Analysis | Data Range |
|---|---|
| Median particle size | 0.295-0.333 microns |
| Dry colour L* | 99.0-99.6 |
| Dry colour a* | −0.50--0.64 |
| Dry colour b* | 1.6-2.2 |

Example 5

Product collected from Examples 1 and 2, as well as a control sample derived from an OTES-treated, non-silica-containing commercial product (yellowing control), were evaluated for their resistance to stabilizer derived yellowing using an in-house version of the Toyo Test, the results from which are presented in Table 2. Said test involved individually compounding said products into DuPont 20 polyethylene (low density polyethylene) along with butylated hydroxytoluene (BHT) and Tinuvin® 770 (Ciba Specialty Chemicals, Tarrytown, N.Y.) using a standard two-roll milling procedure (35 mil roller gap, 220° F. (104.4° C.) and 240° F. (115.6° C.) roller temperatures). The resulting thick films (2.6 wt % pigment, 0.3 wt % BHT, 0.3 wt % Tinuvin® 770) were then hot pressed (~325-350° F. (~162.8-176.7° C.), ~50,000 psi (~3516.2 kg/cm²) for ~2 minutes) into plaques using a pre-made template. The initial CIE (Commission Internationale de l'Eclairage) L*a*b* color coordinates of the plaques were then measured (Hunter Lab Labscan XE, 10° observer angle, D65 light source) and the plaques subsequently placed into an enclosed, ultraviolet light source-containing light box (not temperature controlled). Said plaques were then periodically removed (approximately every 1-2 days) and their CIE L*a*b* color coordinates re-obtained. A consistent rotation scheme was utilized when said plaques were placed back into the light box for continued exposure. After ~218 hours of exposure, the Δb* value associated with each sample was normalized against that of the control sample which yellows significantly under the conditions of this test (Δb* Sample/Δb* Control).

TABLE 2

| Sample | Calculated Pyrogenic SiO₂ Content Of Sample | OTES-Derived Carbon Content Of Sample | Δb* Sample/ Δb* Control after ~218 exposure hours |
|---|---|---|---|
| Non-silica-containing, OTES-treated TiO₂: Yellowing Control | 0.0 wt % | Typically 0.30 wt % (dryer added) | 1.00 (by definition) |
| OTES-treated, pyrogenic silica-encapsulated TiO₂: Sample 1 | 1.5 wt % | 0.31 wt % (dryer added) | 0.13 |
| OTES-treated, pyrogenic silica-encapsulated TiO₂: Sample 2 | ~2.0 wt % | 0.36 wt % (slurry added) | 0.02 |
| OTES-treated, pyrogenic silica-encapsulated TiO₂: Sample 3 | ~2.0 wt % | 0.26 wt % (slurry added) | 0.07 |
| OTES-treated, pyrogenic silica-encapsulated TiO₂: Sample 4 | 1.4 wt % | 0.30 wt % (micronized added) | 0.20 |
| OTES-treated, pyrogenic silica-encapsulated TiO₂: Sample 5 | 1.3 wt % | 0.35 wt % (micronizer added) | 0.21 |
| OTES-treated, pyrogenic silica-encapsulated TiO₂: Sample 6 | 1.3 wt % | 0.36 wt % (micronizer added) | 0.12 |

The data in Table 2 reveal that all of the pyrogenic silica-encapsulated, OTES-treated samples (Samples 1 through 6) possess significantly greater stabilizer derived discolouration resistance relative to the OTES-treated, non-silica-containing, yellowing control sample. This finding has favourable practical implications as it suggests that the product of this invention can be incorporated into polymeric systems possessing a broad range of polymer additives (including stabilizers) without a concern for the occurrence of deleterious, ultraviolet light-driven, discolouration. That said finding is a direct result of the pyrogenic silica encapsulation can be logically inferred from the fact that the only important difference between Sample 1 and the yellowing control sample is that the former possesses a significant quantity of particle encapsulating pyrogenic silica while the latter does not (both sets of samples possess comparable levels of OTES-derived carbon, applied in identical fashion).

Example 6

Product collected from Examples 1 and 2, as well as control samples derived from an OTES-treated, non-silica-containing commercial product (non-lacing control) and from a non-OTES treated, amorphous alumina-containing commercial product (lacing control), were evaluated for their thin film lacing propensity using an in-house developed test. Said test involved individually compounding the above indicated products into polyethylene (NA206, Equistar) using a batch internal mixer (Farrel Banbury° (BR1600) at a 50 wt % product loading (76 vol % fill factor). The resulting masterbatches were then ground into small pieces and individually combined by hand with fresh low density polyethylene (DuPont 20) to yield 20 wt % product mixtures which were then dried overnight (88° C.) in air. Each of the prepared mixtures was then converted (400 g per conversion) into a thin ribbon (~1.0-1.5 mil (~0.0254-0.0381 mm) thick, ~2¾ inches (~6.985 cm) wide) using a single screw extruder. The temperature of the film extrudate was ~610° F. (~321.1° C.). After cooling, the extruded ribbons were then examined for signs of lacing using the rating scheme presented in Table 3.

TABLE 3

| Lacing Test Rating | Description |
|---|---|
| 10+ | No indications of a pre-lacing condition (dark striations) or lacing (elongated thin spots or holes). |
| 10 | No elongated thin spots or holes, but pre-lacing signs are present. |
| 8 | Presence of a few very small elongated thin spots or holes. |
| 6 | Presence of numerous small elongated thin spots or holes. |
| 4 | Presence of numerous large elongated thin spots or holes. |
| 2 | Total film is covered with elongated holes. |

TABLE 3-continued

| Lacing Test Rating | Description |
|---|---|
| 0 | Film break is caused by complete loss of film integrity. |

Data from said examination is presented in Table 4.

TABLE 4

| Sample | Calculated Pyrogenic SiO₂ Content Of Sample | OTES-Derived Carbon Content Of Sample | Lacing Test Rating |
|---|---|---|---|
| Non-silica-containing, OTES-treated TiO₂: Non-Lacing Control | 0.0 wt % | Typically 0.30 wt % (dryer added) | 10+ |
| Wet treatment alumina-encapsulated TiO₂: Lacing Control | 0.0 wt % (alumina derived encapsulation only) | Typically 0.19 wt % (non-OTES derived) | 4 |
| OTES-treated, pyrogenic silica-encapsulated TiO₂: Sample 1 | 1.5 wt % | 0.31 wt % (dryer added) | 10+ |
| OTES-treated, pyrogenic silica-encapsulated TiO₂: Sample 2 | 1.4 wt % | 0.30 wt % (micronized added) | 10+ |
| OTES-treated, pyrogenic silica-encapsulated TiO₂: Sample 3 | 1.3 wt % | 0.35 wt % (micronizer added) | 10+ |
| OTES-treated, pyrogenic silica-encapsulated TiO₂: Sample 4 | 1.3 wt % | 0.36 wt % (micronizer added) | 10+ |
| OTES-treated, pyrogenic silica-encapsulated TiO₂: Sample 5 | ~2.0 wt % | 0.36 wt % (slurry added) | 10+ |
| OTES-treated, pyrogenic silica-encapsulated TiO₂: Sample 6 | ~2.0 wt % | 0.35 wt % (slurry added) | 10+ |

The data in Table 4 reveal that all of the masterbatch samples derived from the pyrogenic silica-encapsulated, OTES-treated samples (Samples 1 through 6) did not lace. This finding has favourable practical implications as it suggests that the product of this invention can be incorporated into thin polymer films at high pigment loading under severe extrusion conditions without a concern for lacing-derived film damage.

Example 7

Product collected from Examples 1 and 2, as well a control sample derived from an OTES-treated, non-silica-containing commercial product (non-photodurable control), were evaluated for their photodurability behaviour (550 exposure hours) using an in-house developed gloss retention test, the results from which are presented in Table 5. Said test involved individually compounding the above indicated products into polyethylene (NA206, Equistar) using a batch internal mixer (Farrel Banbury® BR1600) at a 50 wt % pigment loading (76 vol % fill factor). The resulting masterbatches were ground into small pieces and then individually let down at 420° F. (215.6° C.) to 10 wt % TiO₂ with injection molding grade polypropylene (Montell PH-920S) using a Cincinnati-Milacron (Vista VT85-7) injection molder. The molder-produced 1¾ inches×3 inches×⅛ inch (4.45 cm×7.62 cm×0.318 cm) chips were analyzed for initial gloss (average of readings from the top, middle and bottom of the to-be-exposed side of each chip) using a Byk-Gardener Gloss-Haze meter. Said chips were then weathered in an Atlas Ci65A xenon Weather-Ometer® in accordance with ASTM Method G26-92 (*Annual Book of ASTM Standards*, Volume. 6.01, G26-92, 310-318, (1999)). To eliminate water spotting, water with a minimum resistance of 12 megaohms was used. At periodic intervals, the chips were removed from the Weather-Ometer®, dried, and re-analyzed for surface gloss retention, loss of which results from the product-catalyzed photo-degradation of the chip polymer matrix (greater gloss retention equates with greater photo-durability).

TABLE 5

| Sample | Calculated Pyrogenic SiO₂ Content Of Sample | OTES-Derived Carbon Content Of Sample | % Gloss Retention After 550 Exposure Hours |
|---|---|---|---|
| Non-silica-containing, OTES-treated TiO₂: Non-Photodurable Control | 0.0 wt % | Typically 0.30 wt % (dryer added) | 48.3 |
| OTES-treated, pyrogenic silica-encapsulated TiO₂: Sample 1 | 1.5 wt % | 0.31 wt % (dryer added) | 64.0 |
| OTES-treated, pyrogenic silica-encapsulated TiO₂: Sample 2 | 1.4 wt % | 0.30 wt % (micronized added) | 62.0 |
| OTES-treated, pyrogenic silica-encapsulated TiO₂: Sample 3 | 1.3 wt % | 0.35 wt % (micronizer added) | 61.5 |
| OTES-treated, pyrogenic silica-encapsulated TiO₂: Sample 4 | 1.3 wt % | 0.36 wt % (micronizer added) | 61.2 |
| OTES-treated, pyrogenic silica encapsulated TiO₂: Sample 5 | ~2.0 wt % | 0.36 wt % (slurry added) | 71.5 |
| OTES-treated, pyrogenic silica-encapsulated TiO₂: Sample 6 | ~2.0 wt % | 0.35 wt % (slurry added) | 71.4 |

The data in Table 5 reveal that all of the polyethylene/polypropylene composite chips containing the pyrogenic silica-encapsulated, OTES-treated samples (Samples 1 through 6) exhibited significantly higher gloss retention after exposure (in other words, significantly better photodurability) as compared to the chip containing the OTES-treated, non-silica-containing, non-photodurable control sample. This finding has favourable practical implications given that the photo-passivation of TiO₂ particles is typically accomplished via an aqueous-based, surface deposition of inorganic oxides, treatments which are characteristically prone to moisture retention and/or generation which contribute to thin film lacing. Such treated particles cannot be reliably used for high temperature, thin film extrusion applications, unlike particles resulting from the current invention (see Example 6). That said finding is a direct result of the pyrogenic silica encapsulation can be logically inferred from the fact that the only important difference between Sample 1 and the non-photodurable control sample is that the former possesses a significant quantity of particle encapsulating pyrogenic silica while the latter does not (both sets of samples possess comparable levels of OTES-derived carbon, applied in identical fashion).

Example 8

Product collected from Examples 1 and 2, as well as control samples derived from an OTES-treated, but non-silica-containing commercial product (high processing rate control), were evaluated for their effect on the melt viscosity of highly loaded masterbatch. Said masterbatches were prepared by individually compounding the above indicated products into polyethylene (NA206, Equistar) using a batch internal mixer (Farrel Banbury® BR1600) at an 80 wt % pigment loading (74 vol % fill factor). An ~650 g sample of each of the produced masterbatches was then degassed, while still hot, by repeatedly (5 times) running it through a two-roll mill (35 mil roller gap, 220° F. (104.4° C.) and 240° F. (115.6° C.) roller temperatures). The resulting thick films were cut into slivers (~35 mil×~¼ inch×2 inch (~0.89 mm×~0.64 cm×5.08 cm)) which were then dried overnight in a vacuum oven (204° C., nitrogen purge). Appropriate amounts of the dried slivers were then fed into a Dynisco LCR7001 Capillary Rheometer (die type=X400-15, capillary diameter=0.0400 inch (1.02 mm), L/D=15.00, entrance angle=120°, capillary length=0.6000 inch (1.52 cm)) and their melt viscosity versus shear rate behavior (10-1000 sec$^{-1}$) determined at 190° C. Calculated (from curve fitting) low shear rate (10 sec$^{-1}$) masterbatch melt viscosity data associated with product derived from Example 1 are presented in Table 6 while said data associated with product derived from Example 2 are presented in Table 7.

TABLE 6

| Sample | Calculated Pyrogenic SiO$_2$ Content Of Sample | OTES-Derived Carbon Content Of Sample | Calculated Masterbatch Melt Viscosity (190° C., 10 sec$^{-1}$) |
|---|---|---|---|
| Non-silica-containing, OTES-treated TiO$_2$: High Processing Rate Control 1 | 0.0 wt % | Typically 0.30 wt % (dryer added) | 2951 Pa-sec |
| Non-silica-containing, OTES-treated TiO$_2$: High Processing Rate Control 2 | 0.0 wt % | Typically 0.30 wt % (dryer added) | 3177 Pa-sec |
| OTES-treated, pyrogenic silica-encapsulated TiO$_2$: Sample 1 | ~2.0 wt % | 0.24 wt % (slurry added) | 3128 Pa-sec |
| OTES-treated, pyrogenic silica-encapsulated TiO$_2$: Sample 2 | ~2.0 wt % | 0.31 wt % (slurry added) | 2680 Pa-sec |
| OTES-treated, pyrogenic silica-encapsulated TiO$_2$: Sample 3 | ~2.0 wt % | 0.32 wt % (slurry added) | 2522 Pa-sec |
| OTES-treated, pyrogenic silica-encapsulated TiO$_2$: Sample 4 | ~2.0 wt % | 0.33 wt % (slurry added) | 2464 Pa-sec |

TABLE 7

| Sample | Calculated Pyrogenic SiO$_2$ Content Of Sample | OTES-Derived Carbon Content Of Sample | Calculated Masterbatch Melt Viscosity (190° C., 10 sec$^{-1}$) |
|---|---|---|---|
| Non-silica-containing, OTES-treated TiO$_2$: High Processing Rate Control 3 | 0.0 wt % | Typically 0.30 wt % (dryer added) | 2483 Pa-sec |
| Non-silica-containing, OTES-treated TiO$_2$: High Processing Rate Control 4 | 0.0 wt % | Typically 0.30 wt % (dryer added) | 2662 Pa-sec |
| OTES-treated, pyrogenic silica-encapsulated TiO$_2$: Sample 5 | 1.5 wt % | 0.31 wt % (dryer added) | 2559 Pa-sec |
| OTES-treated, pyrogenic silica-encapsulated TiO$_2$: Sample 6 | 1.4 wt % | 0.30 wt % (micronized added) | 2493 Pa-sec |
| OTES-treated, pyrogenic silica-encapsulated TiO$_2$: Sample 7 | 1.3 wt % | 0.35 wt % (micronizer added) | 2332 Pa-sec |
| OTES-treated, pyrogenic silica-encapsulated TiO$_2$: Sample 8 | 1.3 wt % | 0.36 wt % (micronizer added) | 2423 Pa-sec |

The data in Table 6 reveal that all of the masterbatches produced with the pyrogenic silica-encapsulated, OTES-treated samples involving slurry addition of OTES (Samples 1 through 4) possessed low shear rate melt viscosity values either comparable to or unexpectedly less than that derived from the masterbatches containing the OTES-treated, non-silica-containing, high processing rate control samples (Controls 1 and 2). The data in Table 7 show that similar behaviour is displayed by the masterbatches derived from the pyrogenic silica-encapsulated, OTES-treated samples involving dryer and micronizer addition of OTES (Samples 5 through 8, compared against Controls 3 and 4). The above aggregate findings have favourable practical implications as they suggest that the product of this invention can be incorporated into masterbatch at high loadings without a concern for the occurrence of undesirable masterbatch processing rate restrictions.

Example 9

Product collected from Example 2, as well as a control sample derived from an OTES-treated, non-silica-containing commercial product (high processing rate control), were evaluated for their effect on the melt flow rate of highly loaded masterbatch. Said masterbatches were prepared by individually compounding the above indicated products into polyethylene (NA206, Equistar) at a 70 wt % product loading using a 30 mm co-rotating twin screw extruder (Werner and Pfleiderer) set up to extrude masterbatch at 50, 60 and 70 pound/hour (22.7, 27.2 and 31.8 kg/hour) rates (300 rpm screw speed, all barrel temperature controllers set to 150° C.). A general purpose screw design was used as was standard post-compounding equipment consisting of a strand die, a cooling water trough and an air knife pelletizer. Neither screens nor breaker plates were employed during the compounding runs. The produced masterbatch pellets (as well as pellets of the unpigmented resin used to make the above described masterbatches) were vacuum dried under a nitrogen purge (204° C., 12 hours) prior to their analysis for melt flow rate. Said analysis was carried out at 190° C. using a Dynisco Kayeness Model D4004 melt indexer in accordance with ASTM Method D-1238 Condition 190/2.160 (360 seconds preheat time, sample cuts taken at 15 second intervals). The resulting data is presented in Table 8.

TABLE 8

| Sample | Calculated Pyrogenic SiO$_2$ Content Of Sample | OTES-Derived Carbon Content Of Sample | Masterbatch Throughput (lb/hour) | Melt Flow Rate (190° C.) |
|---|---|---|---|---|
| Unpigmented NA206 polyethylene | — | — | — | 13.4 |
| Non-silica-containing, OTES-treated TiO$_2$: High Processing Rate Control 1 | 0.0 wt % | Typically 0.30 wt % (dryer added) | 50 | 4.3 |
| OTES-treated, pyrogenic silica-encapsulated TiO$_2$: Sample 1 | 1.5 wt % | 0.31 wt % (dryer added) | 50 | 5.6 |
| Non-silica-containing, OTES-treated TiO$_2$: High Processing Rate Control 1 | 0.0 wt % | Typically 0.30 wt % (dryer added) | 60 | 4.3 |
| OTES-treated, pyrogenic silica-encapsulated TiO$_2$: Sample 1 | 1.5 wt % | 0.31 wt % (dryer added) | 60 | 5.8 |
| Non-silica-containing, OTES-treated TiO$_2$: High Processing Rate Control 1 | 0.0 wt % | Typically 0.30 wt % (dryer added) | 70 | 4.7 |
| OTES-treated, pyrogenic silica-encapsulated TiO$_2$: Sample 1 | 1.5 wt % | 0.31 wt % (dryer added) | 70 | 6.0 |

The data in Table 8 reveal that, independent of their production rate, the masterbatches produced with the pyrogenic silica-encapsulated, OTES-treated sample (Sample 1) possessed noticeably higher melt flow rate values relative to those of the masterbatch produced using the OTES-treated, non-silica-containing, high processing rate control sample (Control 1). This unexpected finding has favourable practical implications as it suggests that the product of this invention can be incorporated into masterbatch at high loadings without a concern for the occurrence of undesirable masterbatch processing rate restrictions. Further evidence in this regard is provided in Example 10. That said finding is a direct result of the pyrogenic silica-encapsulation can be logically inferred from the fact that the only important difference between Sample 1 and the high processing rate control sample is that the former possesses a significant quantity of particle encapsulating pyrogenic silica while the latter does not (both sets of samples possess comparable levels of OTES-derived carbon, applied in identical fashion).

Example 10

Product collected from Examples 1 and 2, as well as a control sample derived from an OTES-treated, non-silica-containing commercial product (high processing rate control), were evaluated for their effect on the melt flow rate of highly loaded masterbatch. Said masterbatches were prepared by individually compounding the above indicated products into polyethylene (NA206, Equistar) at an 80 wt % product loading using a Thermo Haake Rheomix 600p internal mixer (Thermo Electron Corporation) fitted with a pair of Banbury Mixer-type rotors (110° C. mixer pre-heat temperature; 200 rpm initial rotor speed, decreased to 120 rpm once the masterbatch temperature reached 130° C.; 10 minutes total compounding time). The resulting masterbatches were ground into small pieces prior to their analysis for melt flow rate. Said analysis was carried out at 190° C. using a Dynisco Kayeness Model 7053 melt indexer in accordance with ASTM Method D-1238 Condition 190/2.160 (360 seconds preheat time, sample cuts taken at 30 second intervals). The resulting data is presented in Table 9.

TABLE 9

| Sample | Calculated Pyrogenic SiO$_2$ Content Of Sample | OTES-Derived Carbon Content Of Sample | Melt Flow Rate (190° C.) |
|---|---|---|---|
| Unpigmented NA206 polyethylene | — | — | 13.6 (average of 2 determinations) |
| Non-silica-containing, OTES-treated TiO$_2$: High Processing Rate Control 1 | 0.0 wt % | Typically 0.30 wt % (dryer added) | 1.7 (average of 4 determinations) |
| OTES-treated, pyrogenic silica-encapsulated TiO$_2$: Sample 1 | 1.5 wt % | 0.31 wt % (dryer added) | 2.4 (average of 4 determinations) |
| OTES-treated, pyrogenic silica-encapsulated TiO$_2$: Sample 2 | 1.3 wt % | 0.36 wt % (micronizer added) | 2.9 (average of 4 determinations) |
| OTES-treated, pyrogenic silica-encapsulated TiO$_2$: Sample 3 | 1.3 wt % | 0.35 wt % (micronizer added) | 2.5 (average of 4 determinations) |
| OTES-treated, pyrogenic silica-encapsulated TiO$_2$: Sample 4 | 1.4 wt % | 0.30 wt % (micronizer added) | 2.1 (average of 4 determinations) |
| OTES-treated, pyrogenic silica-encapsulated TiO$_2$: Sample 5 | ~2.0 wt % | 0.36 wt % (slurry added) | 2.1 (average of 2 determinations) |

The data in Table 9 reveal that all of the masterbatches produced with the pyrogenic silica-encapsulated, OTES-treated samples (Samples 1 through 5) possessed noticeably higher melt flow rate values relative to that associated with the masterbatch produced using the OTES-treated, non-silica-containing, high processing rate control sample (Control 1). This unexpected finding has favourable practical implications as it suggests that the product of this invention can be incorporated into masterbatch at high loadings without a concern for the occurrence of undesirable masterbatch processing rate restrictions. That said finding is a direct result of the pyrogenic silica encapsulation can be logically inferred from the fact that the only important difference between Sample 1 and the high processing rate control sample is that the former possesses a significant quantity of particle encapsulating pyrogenic silica while the latter does not (both sets of samples possess comparable levels of OTES-derived carbon, applied in identical fashion).

Example 11

Product collected from Example 2, as well as control samples derived from an OTES-treated, non-silica-containing commercial product (hydrophobic product control), had their loose and tapped bulk density values determined, see Table 10, using in-house developed methodology. Said methodology involved an initial hand sieving of product through a 10 mesh sieve over a tared pan until said pan was overfilled. Excess product above the rim of the pan was then carefully and uniformly removed using a large spatula blade held at a 45° angle (from horizontal), taking care not to jostle the contents of the pan. The pan was then weighed to determine the amount of product added and the loose bulk density calculated (pan volume=150.58 cm$^3$). A plastic extension ring was next carefully added to the pan. The extra volume afforded by said ring was almost completely filled with additional product, added using a metal spoon. The wooden handle end of a large spatula was then used to hand tap the underside of the pan at its center point using the same force for each tap. After 50 taps, the plastic extension ring was carefully removed and the excess product above the rim of the pan removed as described above. The pan was then re-weighed to determine the amount of product present and the tapped bulk density calculated.

TABLE 10

| Sample | Calculated Pyrogenic SiO$_2$ Content Of Sample | OTES-Derived Carbon Content Of Sample | Loose Bulk Density | Tapped Bulk Density |
|---|---|---|---|---|
| Non-silica-containing, OTES-treated TiO$_2$: Hydrophobic Pigment Control 1 | 0.0 wt % | Typically 0.30 wt % (dryer added) | 0.77 g/mL | 1.17 g/mL |
| Non-silica-containing, OTES-treated TiO$_2$: Hydrophobic Pigment Control 2 | 0.0 wt % | Typically 0.30 wt % (dryer added) | 0.76 g/mL | 1.22 g/mL |
| OTES-treated, pyrogenic silica-encapsulated TiO$_2$: Sample 1 | 1.5 wt % | 0.31 wt % (dryer added) | 0.87 g/mL | 1.41 g/mL |
| OTES-treated, pyrogenic silica-encapsulated TiO$_2$: Sample 2 | 1.4 wt % | 0.30 wt % (micronized added) | 0.83 g/mL | 1.25 g/mL |
| OTES-treated, pyrogenic silica-encapsulated TiO$_2$: Sample 3 | 1.3 wt % | 0.35 wt % (micronizer added) | 0.90 g/mL | 1.34 g/mL |
| OTES-treated, pyrogenic silica-encapsulated TiO$_2$: Sample 4 | 1.3 wt % | 0.36 wt % (micronizer added) | 0.91 g/mL | 1.33 g/mL |

The data in Table 10 reveal that the loose and tapped bulk densities of the pyrogenic silica-encapsulated, OTES treated samples (Samples 1 through 4) are greater than those associated with the OTES-treated, non-silica-containing, hydrophobic control sample group (Controls 1 and 2). This unexpected finding has favourable practical implications given that increased product bulk density tends to result in increased throughput during commercial scale polymer compounding. That said finding is a direct result of the pyrogenic silica encapsulation can be logically inferred from the fact that the only important difference between Sample 1 and the control samples is that the former possesses a significant quantity of particle encapsulating pyrogenic silica while the latter do not (both sets of samples possess comparable levels of OTES-derived carbon, applied in identical fashion).

We claim:

1. A thermoplastic resin comprising a titanium dioxide pigment having on the surface of said pigment a substantially encapsulating layer comprising a pyrogenic-silica; wherein the pyrogenic silica-encapsulated titanium dioxide is treated with octyltriethoxysilane and the thermoplastic resin is polyethylene.

2. The thermoplastic resin of claim 1, wherein the polyethylene is an ultra low density polyethylene, a very low density polyethylene, a linear low density polyethylene, a low density polyethylene, a medium density polyethylene, a high density polyethylene, a high molecular weight high density polyethylene, an ultra high molecular weight high density polyethylene, or a blend thereof.

3. An extruded article comprising the thermoplastic resin of claim 1.

4. A molded article comprising the thermoplastic resin of claim 1.

5. A cast film comprising the thermoplastic resin of claim 1.

6. A blown film comprising the thermoplastic resin of claim 1.

7. A slit film comprising the thermoplastic resin of claim 1.

8. An extruded fiber comprising the thermoplastic resin of claim 1.

9. A wire coating comprising the thermoplastic resin of claim 1.

10. An injection molded article comprising the thermoplastic resin of claim 1.

11. A blow molded article comprising the thermoplastic resin of claim 1.

12. A rotational molded article comprising the thermoplastic resin of claim 1.

* * * * *